United States Patent [19]

Reynolds et al.

[11] 4,121,845

[45] Oct. 24, 1978

[54] BOOT FOR SLIDABLY GUIDED MEMBER

[75] Inventors: Desmond Henry James Reynolds, West Midlands; Kenneth Maurice Quiney, Birmingham, both of England

[73] Assignee: Girling Limited, Birmingham, England

[21] Appl. No.: 856,203

[22] Filed: Nov. 30, 1977

Related U.S. Application Data

[63] Continuation of Ser. No. 701,187, Jun. 30, 1976, abandoned.

[30] Foreign Application Priority Data

Jul. 1, 1975 [GB] United Kingdom ............... 27628/75

[51] Int. Cl.² ..................... F16D 55/00; F16J 15/32
[52] U.S. Cl. ........................... 277/212 FB; 188/72.4
[58] Field of Search ......... 277/212 R, 212 C, 212 FB; 188/72.4

[56] References Cited

U.S. PATENT DOCUMENTS

| 2,443,506 | 6/1948 | Hohl et al. | 277/212 R X |
| 3,310,326 | 3/1967 | Melone | 277/212 FB |

FOREIGN PATENT DOCUMENTS 1,212,372  3/1966  Fed. Rep. of Germany .... 277/212 FB

*Primary Examiner*—Robert S. Ward, Jr.
*Attorney, Agent, or Firm*—Scrivener, Clarke, Scrivener & Clarke

[57] ABSTRACT

In a boot assembly for forming a dust seal between an axially movable guided member, such as a piston, and a guide member, such as a vehicle brake actuator housing, a seal which seals with the guide member is carried by a rigid carrier member and one part of the seal is movable relative to the carrier so as to be axially elongated and radially reduced in thickness during assembly thereby to reduce the force required to assemble the seal into position on the guide member.

14 Claims, 13 Drawing Figures

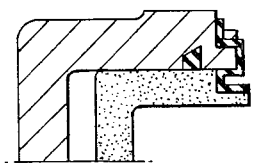
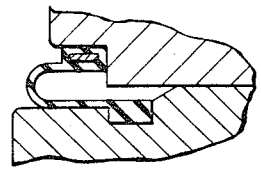
FIG.1(a)   FIG.1(b)
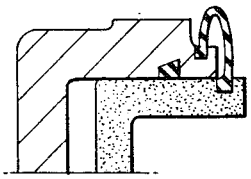
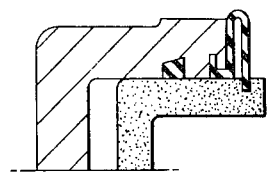
FIG.1(c)   FIG.1(d)
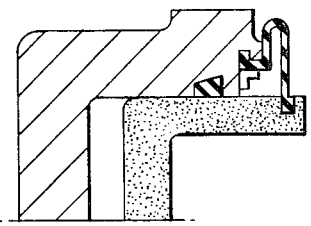
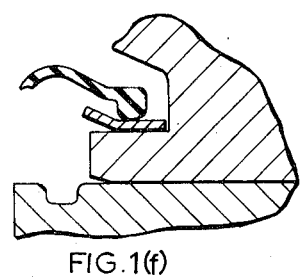
FIG.1(e)   FIG.1(f)
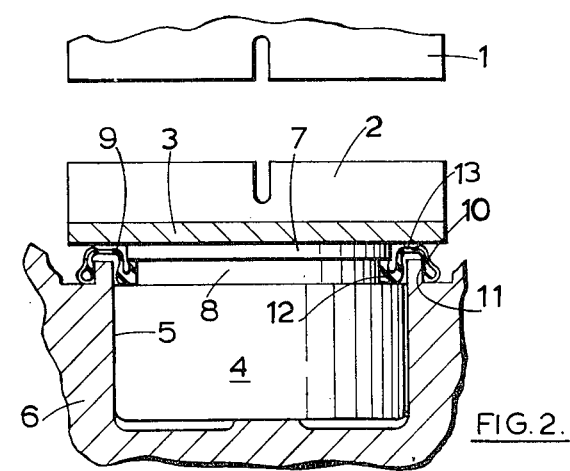
FIG.2.

BOOT FOR SLIDABLY GUIDED MEMBER

This is a continuation of application Ser. No. 701,187, filed June 30, 1976, now abandoned.

This invention relates to a boot assembly for preventing ingress of dirt or fluid into one end of the bore of a guide member in which a guided member is axially slidable, and of the kind comprising a first annular portion adapted to seal against an annular surface of the guide member adjacent to that end of the bore, a second annular portion adapted to seal against the guided member, and a flexible impermeable web connecting said first and second portions to accommodate relative axial movement of the guided and guide members. The annular portions may be regular or irregular annuli depending on the cross-sectional shape of the guided member and on the shape of said surface.

Boot assemblies of this kind are commonly used in hydraulic actuators where the guided member comprises an actuator piston, and the guide member comprises the actuator housing. It is particularly important to prevent ingress of foreign materials into the hydraulic actuator bore since the very small clearance between the piston and the wall of the bore renders the piston extremely liable to seizure.

An efficient seal between the second portion of the seal assembly and the piston can be accomplished relatively easily by the use of an elastomeric ring for said second portion which can be stretched to fit over and grip the piston. The wall of the piston may be provided with a groove to receive the elastomeric ring and/or a separate rigid clamping ring may be used.

It is more difficult, however, to provide an efficient and compact seal between the first portion of the seal assembly and the housing. If the first portion of the seal assembly were to be made an elastomeric ring for engagement with an internal recess in the housing adjacent to the end of the bore the ring would need to be in compression rather than tension in order to press against the housing, but in compression the ring would be liable to buckling.

This difficulty can be overcome in part by arranging for the first portion of the boot assembly to be an elastomeric ring which is stretched over an external surface of the housing adjacent to the end of the bore, with the web wrapped around the end of the bore. If the part of the housing adjacent to the end of the bore can be machined with an external recess to receive and retain the first portion of the boot assembly an efficient seal can be made, although assembly of the boot onto the housing is then difficult. However, with the caliper bodies of disc brakes the bridge of the body often denies access for a machining tool for producing a groove by turning.

Plain external surfaces can more easily be machined on such a housing by axial feed of a tool. The first portion of the boot assembly may be secured to such a plain external surface by a rigid clamping ring, but in practice such a ring may take up too much space, be expensive, difficult to assemble, or may pinch the rubber or cause it to pucker.

According to one aspect of the invention we provide a booted guide assembly of the kind comprising a guided member axially slidable in a bore of a guide member and a boot assembly for preventing ingress of dirt or fluid into one end of the bore, the boot assembly comprising a first annular portion adapted to seal against an annular surface of the guide member adjacent to that end of the bore, a second annular portion adapted to seal against the guided member, and a flexible impermeable web connecting said first and second portions to accommodate relative axial movement of the guided and guide members, in which the first portion of the boot assembly comprises an annular rigid carrier carrying an elastomeric seal a first annular part of the seal is permanently secured to a first annular portion of the carrier, and a second annular part of the seal spaced axially outwardly of the bore from said first part is located internally of the carrier and is trapped between a second annular portion of the carrier and said surface of the guide member to form a seal therebetween, said surface being a plain surface facing outwardly of the guide member, and said second part of the seal being unattached to said second portion of the carrier, the arrangement being such that during assembly of the first portion of the boot assembly onto the guide member by application of an axial force to the carrier member said first part of the seal and said first portion of the carrier pass with clearance over said surface, and friction between said second part of the seal and said surface results in axial elongation of said second part of the seal to enable the seal to be pulled into position on said surface by the carrier member.

When the assembly force is removed from the carrier the axial tension in the second part of the seal is released to leave that part of the seal in radial compression trapped between the second portion of the carrier and said plain surface of the guide member.

The surface of the guide member is a plain surface and so can be machined with ease in most applications.

According to a second aspect of the invention we provide a boot assembly of the kind set forth in which the first portion comprises a rigid annular carrier carrying an annular elastomeric seal, a first annular part of the seal being permanently secured to a first annular portion of the carrier member, and a second annular part of the seal spaced axially from said first part being located within the carrier but unattached to a radially adjacent second annular portion of the carrier, the radial thickness of the second part of the seal being chosen such that when the second part of the seal is in face contact with the second portion of the carrier and is not in axial tension the minimum internal lateral dimension of the second part of the seal is less than the corresponding dimensions of the first part of the seal and of the first portion of the carrier.

In the unstressed state of the second part of the seal that part may contact the second portion of the carrier but preferably it is spaced radially inwardly from the second portion of the carrier to enhance the frictional engagement between the second part of the seal and said surface during assembly of the boot to the guide member to increase the axial elongation of the second part of the seal and thereby increase the radial compressional force in the second part of the seal in the assembled condition. whilst also easing assembly.

Preferably the web is integral with the second part of the seal.

The second portion of the carrier is conveniently of internal frusto-conical shape in order to provide a wedging action.

The carrier is conveniently in the form of a sheet metal pressing of which the first portion comprises an inturned annular bead within which the first part of the seal is clamped, and the second portion is of frusto conical outline.

The invention will now be further described with reference to the accompanying drawings in which:

FIGS. 1 (a)-(f) are partial cross-sectional views of previously known boot assemblies located in caliper disc brake actuators.

FIG. 2 is a cross-sectional partial view of a caliper disc brake incorporating an example of a boot in accordance with the present invention, the boot sealing against an external cylindrical surface on the actuator housing, and the actuator piston being shown in its fully retraced position;

Figure 3:
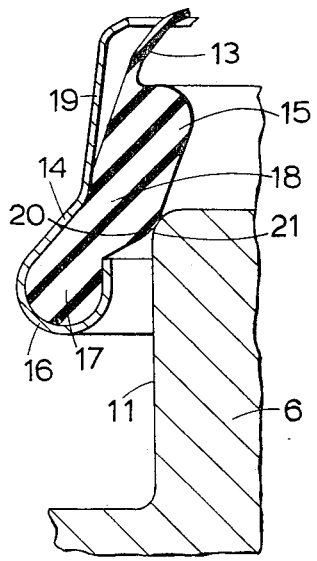
FIGS. 3 and 4 are enlarged partial views of the assembly of FIG. 2 but showing the deformation of the rubber seal as it is pulled onto the housing by a pressed metal carrier attached to it.

The disadvantages of some known arrangements of boot assemblies will firstly be described with reference to FIGS. 1 (a)-(f).

FIG. 1 (a) shows a known arrangement in which a rubber boot is secured on a plain external cylindrical surface of the actuator housing by a metallic retaining ring. Such an arrangement is difficult to assemble, especially when the actuator is on a vehicle and a brake disc is in position, and it is difficult to ascertain whether or not the boot has been secured properly.

FIG. 1 (b) shows a known arrangement in which a bead of the rubber boot is held against a radially inwardly facing surface of the actuator housing by a metallic ring moulded into the bead. This arrangement requires a high assembly force since the portion of the rubber bead sandwiched between the retaining ring and the actuator surface is resiliently sheared during assembly. It is difficult to inspect the assembled boot, and when replacement is necessary this is difficult.

FIG. 1 (c) shows an example of a known arrangement in which the housing is provided with an external annular groove to receive a bead on the boot. The groove is very difficult to machine in a caliper disc brake, and assembly and inspection are also difficult.

FIG. 1 (d) shows an attempt to make use of an internal groove in the actuator housing which can be machined by a form tool fed radially outwardly. However, it is impossible to replace such a boot without removing the piston from the actuator housing and so it is necessary to remove the caliper of a caliper disc brake from the disc to effect replacement of the boot. Also, there is considerable friction between the boot and the piston.

FIG. 1 (e) is a further known arrangement in which a retaining ring holds a bead on the boot within an internal annular groove. This construction avoids the frictional drag associated with the previously considered construction, but it is difficult to assemble and inspection is made very difficult since the boot hides the retaining ring.

FIG. 1 (f) shows an enlarged view of a known construction in which the actuator housing is machined with a plain external cylindrical surface, and then a metallic insert is pressed over this surface to define a lip for retaining a bead of the boot. This avoids the need to machine an annular groove in the housing, but it is difficult to stretch the bead of the boot over the lip during assembly, especially if the brake disc is in place.

Thus each of these known constructions suffers from some disadvantage which makes it costly to manufacture or difficult to replace the boot assembly.

In the caliper disc brake of FIG. 2 which is in accordance with the present invention opposed friction pads 1 and 2 are adapted to be applied to opposite surfaces of a brake disc, not shown. The pad 2 is secured to a backing plate 3 engaged by an actuator piston 4 working in a cylindrical bore 5 of an actuator housing 6 integral with a brake caliper, not shown.

The piston 4 has a reduced diameter portion 7 at its outer end adjacent to an annular groove 8.

A boot assembly 9 comprises a first portion 10 sealing against a radially outwardly facing cylindrical face 11 of the housing adjacent to the outer end of the bore 5, a second portion 12 of rubber and of U-shape in cross-section under circumferential tension in groove 8 to form a seal against the piston, and a rubber web 13 integral with the second portion 12. The flexibility of the web 13 and the shape of the second portion enables the piston to move in the bore without affecting the sealing of the boot assembly to the piston and to the housing.

Figure 6:
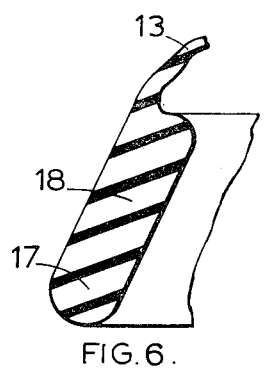
FIG. 6 is an enlarged cross-sectional view of the rubber seal shown in FIGS. 3 to 5 but in its released condition prior to the carrier being secured to it.
Figure 7:
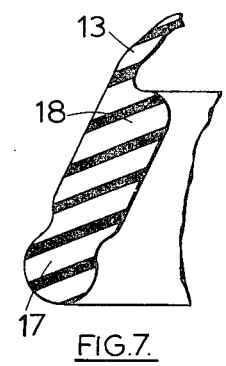
FIG. 7 is a view similar to FIG. 6 but of a modified rubber seal in accordance with the invention in its released condition.

Referring now to FIG. 3, it will be seen that the first portion of the boot assembly comprises a pressed sheet metal carrier 14 secured to a rubber seal 15 integral with web 13. A first portion 16 of the carrier 14 is formed as an annular inturned bead within which is gripped a first part 17 of the seal 15. The first portion 16 of the carrier is initially cylindrical and is turned to grip the seal by pressing or rolling. Alternatively, the rubber could be moulded directly in the carrier. FIG. 6 shows the unstressed cross-section of the seal of FIGS. 3 to 6 before it has been gripped by the carrier, and FIG. 7 shows a modification in which the seal cross-section has been chosen to improve the retention of the seal to the carrier.

The seal 15 has a second part 18 of substantial radial thickness, as compared with the thickness of the web 13, located intermediate the first part 17 and the web 13 and of generally hollow frusto-conical shape when unstressed. The second part 18 is initially spaced radially from a second portion 19 of the carrier 14 of frusto-conical shape but having a smaller cone angle.

Figure 4:
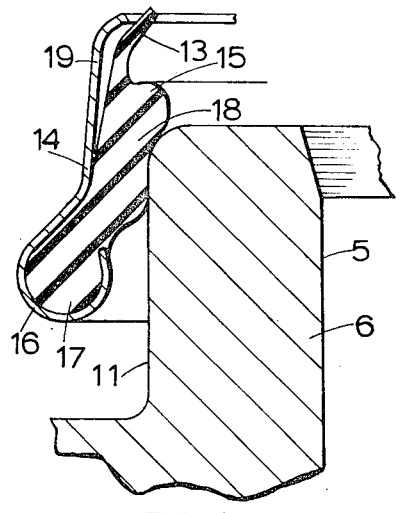

The boot assembly 9 is assembled in the brake caliper by firstly pushing the assembly 9 over the upper end of the piston 4 until the second portion 12 of the boot snaps into the groove 8. The piston 4 is then inserted into bore 5, plate 3 and pad 2 located over it, and then the piston is pushed downwardly by applying an axial force to the pad. As the piston approaches the blind end of the bore the radially inner face 20 of seal 15, as shown in FIG. 3, engages with a rounded corner 21 on the housing. The carrier 19 is urged axially towards the housing by its engagement with plate 3, and the first part 17 of the seal 15 is pulled downwardly by the first portion 16 of the carrier 14. Owing to friction acting between the face 20 of the seal 15 and the corner 21 of the housing as shown in FIG. 4 the second part 18 of the seal 15 becomes axially elongated and therefore radially reduced in thickness. The reduction in thickness of the second part 18 enables the carrier and seal to be pushed home into the housing since the reduced thickness can be accommodated between the second portion 19 of the carrier and the cylindrical face 11 of the housing 6. The reduction in thickness of the second part 18 is facilitated by that part being able to slide relative to the carrier 19.

If desired, the carrier may be urged into engagement with the housing by a special tool or by means other than the plate 3.

The upper end of the carrier member extends axially outwardly of the bore beyond the second part 18 of the seal to enclose an annular portion of the web 13 adjacent to where the web joins the second part 18 and so protects the web from damage by the plate 3 on assembly.

It will be noted that the internal diameters of the first portion 16 of the carrier 14, and that of the first part 17 of the seal are greater than the minimum internal diameter of the second part 18 of the seal such that it is the second part of the seal which engages the surface 11 rather than any other part.

Figure 5:
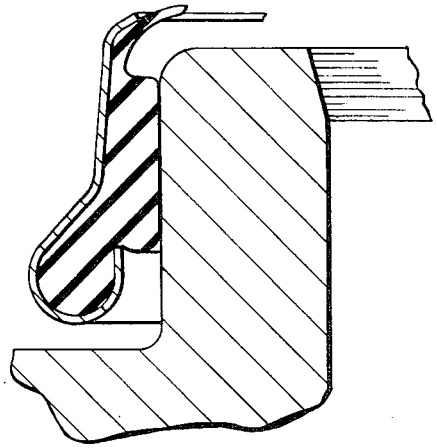
FIG. 5 is a view corresponding to FIGS. 3 and 4 but showing the boot assembly in position on the housing.

When the piston has been pushed fully into the bore 5 and the axial force applied to the carrier 14 by the plate 3 has been relieved the seal 15 and carrier 14 are in the position shown in FIG. 5. Release of the axial force on the carrier 14 relieves the axial tension forces in the second part 18 of the seal 15 so that the second part 15 becomes radially compressed between the second portion 19 of the carrier and the cylindrical face 11 of the housing to retain the seal and carrier in position on the housing and to form an effective and compact seal with the housing.

It will be appreciated that the face 11 on the housing may be machined by axial feed of a tool if necessary rather than by radial feed of a tool, and that the seal 15 and carrier 14 occupy a minimum space.

The boot assembly may be pressed into position on the actuator housing by a relatively small force, but a considerably greater force is required to dislodge the boot assembly from the housing. In order to remove the boot assembly when it is desired to replace it a coin or screw-driver blade may be inserted under the portion 16 of the carrier to prise the first portion of the boot assembly off the housing. The seal is protected against damage by the bead of the carrier. The carrier is so shaped to protect the boot from damage during this operation in the embodiment illustrated.

In the known version of FIG. 1 (b), on the other hand, the force needed to assemble the boot to the housing is equal to the force needed to remove it again, since the rubber which engages with the actuator housing is bonded to the metallic ring and so is prevented from being axially extended during assembly of the rubber to the housing. Since it is desirable to make the disassembly force high the assembly force with that known arrangement is also high which is a disadvantage.

Thus the boot assembly described above with reference to FIGS. 2 to 5 has the combined advantage of cheapness, ease of inspection, ease of assembly and disassembly, security of fixing on the housing, ease of machining of the actuator housing, and protection against tearing of the rubber afforded by the metal carrier.

In a modification of the boot assembly shown in FIGS. 2 to 5 the carrier comprises a sheet metal ring of plain frusto-conical outline, and the seal carried by the carrier is of similar shape to that shown in FIG. 6 but its lower end is extended, wrapped around the lower edge of the metal ring, and secured in face contact with the outer surface of the ring by adhesive.

Figure 8:
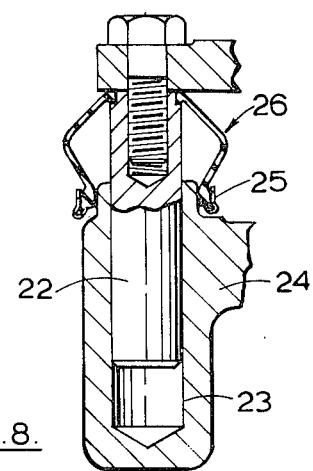
FIG. 8 is a partial cross-sectional view of a disc brake to illustrate the application of the invention to the guide pins of such a brake.

Referring now to FIG. 8 there is shown an application of the invention to the guide pins of a caliper disc brake. A guide pin 22 is a sliding fit in a blind bore 23 provided in a part 24 of a caliper. The part 24 is machined with an external cylindrical surface, analogous to surface 11, to receive the first portion 25 of a boot assembly 26. It is important that boots located in this position should not be pulled from the caliper part 24 owing to axial movement of the guide pin in the bore 23, and the present invention enables a high disassembly force to be achieved.

We claim:

1. The combination of a disc brake and a boot assembly, said disc brake being of the type having a guided member axially slidable in a bore of a guide member during the application and release of the brake, said boot assembly preventing ingress of dirt or fluid into one end of the bore and comprising a first annular portion sealing against an annular surface of the guide member adjacent to said one end of the bore, a second annular portion sealing against the guided member, and a flexible impermeable web connecting said first and second portions to accommodate relative axial movement of the guided and guide members, wherein said surface of the guide member is a plain surface extending parallel to the axis of said bore and facing outwardly of the guide member, the first annular portion of the boot assembly comprising an annular rigid carrier carrying an elastomeric seal, a first annular part of the seal being permanently secured to a first annular portion of the carrier, and being spaced radially outwardly from said surface of said guide member and a second annular part of the seal spaced axially outwardly relative to the bore from said first part and located internally of the carrier, said second part being trapped between a second annular portion of the carrier and said surface of the guide member to form a seal therebetween, and said second part of the seal being unattached to said second portion of the carrier, the arrangement being such that during assembly of the first portion of the boot assembly onto the guide member by application of an axial force to the carrier member said first part of the seal passes with clearance over said surface, and friction between said second part of the seal and said surface results in axial elongation of said second part of the seal to enable the seal to be pulled into position on said surface by said axial force on the carrier.

2. The combination of claim 1 in which the disc brake includes an actuator housing and the guide member comprises said housing, and said guided member comprises a piston adapted to apply said brake.

3. The combination of claim 2 in which the disc brake is a caliper disc brake and said housing is integral with the caliper portion of said brake.

4. The combination of claim 1 in which the disc brake is a caliper disc brake and includes a guide pin, the guided member comprising said guide pin.

5. The combination of claim 1 in which said first portion of said carrier is spaced radially outwardly from said surface of said guide member.

6. The combination of claim 1 in which the guided member is of cylindrical cross-section, and said surface of the guide member comprises a plain cylindrical surface.

7. The combination of claim 1 in which the web is integral with the second part of the seal.

8. The combination of claim 6 in which the second portion of the carrier member is of internal frusto-conical shape.

9. The combination of claim 1 in which the carrier extends over the axially inner end of the seal.

10. The combination of claim 9 in which the carrier member is of sheet material, the first portion of the carrier member comprising an inturned bead within which is retained the first part of the seal.

11. The combination of claim 1 in which the first part of the seal is secured to the carrier by adhesive or by being moulded on the carrier.

12. The combination of claim 7 in which the carrier extends axially beyond the second part of the seal in the direction outwardly of the bore so as to enclose an annular portion of the web adjacent to the junction between the web and the seal.

13. The combination of claim 1 in which said surface of the guide member is defined by one wall of an annular groove machined in the guide member.

14. The combination of claim 1 in which said surface terminates in a rounded or chamfered corner at its axially outer end.

* * * * *